April 6, 1926.
H. E. BROTEMARKLE
BICYCLE LOCK
Filed March 13, 1923
1,579,639
Fig. 1.
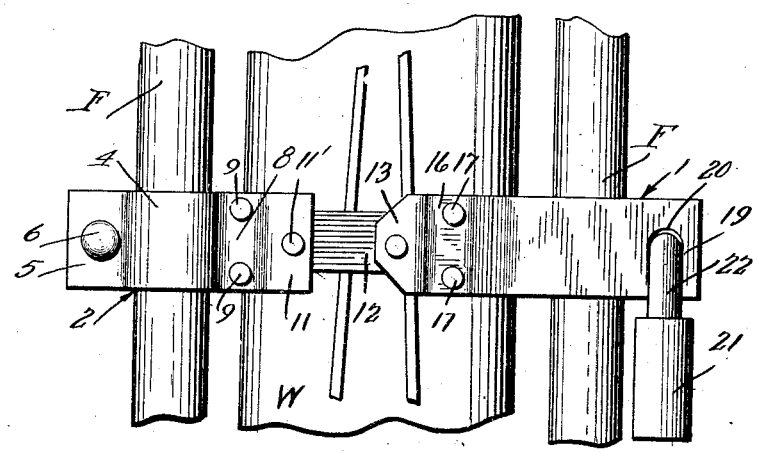
Fig. 2.
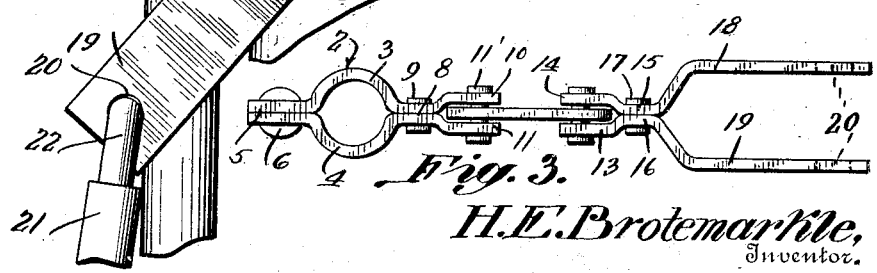
Fig. 3.
H. E. Brotemarkle,
Inventor.
By C. A. Snow & Co.
Attorneys Patented Apr. 6, 1926.

1,579,639

UNITED STATES PATENT OFFICE.

HAROLD EDWARD BROTEMARKLE, OF CLINTON, MISSOURI.

BICYCLE LOCK.

Application filed March 13, 1923. Serial No. 624,771.

*To all whom it may concern:*

Be it known that I, HAROLD E. BROTE-MARKLE, a citizen of the United States, residing at Clinton, in the county of Henry and State of Missouri, have invented a new and useful Bicycle Lock, of which the following is a specification.

This invention relates to locks for bicycles and the like.

The object of the invention is to provide simple and efficient means for locking the rear wheel of a bicycle when not in use, the means being of a novel construction and including the minimum number of parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompayning drawings:—

Figure 1 represents a front elevation of a portion of a bicycle wheel and the rear forks with this device shown applied and in operative position.

Fig. 2 is a similar view with the device in inoperative position, and

Fig. 3 is a top plan view of the device detached.

The device constituting this invention is shown applied to the rear forks F of a bicycle between which the wheel W is located, the device being designed to extend transversely through the wheel between the spokes thereof and to be attached permanently to one member of the fork and detachably to the other. When so applied, the wheel cannot turn and the bicycle is thus prevented from being stolen or used by unauthorized persons.

The holder or lock 1 comprises a clamp 2 for permanent attachment to one member of the fork F and composed of two cooperating outwardly bowed clamping members 3 and 4 which merge at one end into parallel arms 5 which are secured together by a rivet 6 which is upset after being applied to prevent separation of these arms. The other ends of the clamping jaws 3 and 4 merge into parallel arms 8 which are riveted together by rivet 9 and by means of which the attachment is securely mounted on the left hand member of the fork. The arms 8 have their outer ends offset laterally in opposite directions and arranged parallel as shown at 10 and 11 and through which extends a pintle 11′. This pintle 11′ secures between the arms 10 and 11 one end of a link 12, the other end of which is pivotally mounted between parallel arms 13 and 14 of another clamp which is designed to be detachably engaged with the other member of the bicycle fork. The arms 13 and 14 are offset inwardly at their inner ends and merge into parallel arms 15 and 16 arranged in contact with each other and secured by riveting or otherwise, rivets 17 being here shown for connecting these members. The arms 15 and 16 are offset laterally and outwardly at their outer ends and merge into parallel bars or arms 18 and 19 which are designed to straddle the fork member F as shown at the right of Fig. 1. These arms 18 and 19 have registering apertures 20 in their free ends to receive a shackle 22 of a padlock 21.

In the use of this device, the permanent clamp 2 is mounted on one member of the fork F as is shown clearly in Figs. 1 and 2 and the detachable clamping member composed of the arms 18 and 19 is designed to be swung upward and straddle the other member of the fork, it being understood that this upward swinging of the removable clamp causes it to pass through the wheel W between the spokes thereof. When positioned in the manner above set forth, the shackle 22 of the padlock 21 is inserted through the registering apertures 20 in the arms 18 and 19 and the shackle locked. The wheel cannot then be turned until the lock is released. When the lock is released, the removable clamping member is swung downwardly into the position shown in Fig. 2 below the permanent clamp 2 and straddles the member of the fork on which said clamp is mounted. When so positioned, the lock 21 is passed through the apertures 20 and the device is locked in inoperative position.

By the use of this holder, the bicycle rider needs to carry only the key of the lock 21 in his pocket avoiding carrying of the cumbersome chains and locks heretofore in use.

This holder is constructed of comparatively few parts, thereby rendering it cheap to manufacture and which may be readily applied and when once attached remains on the bicycle indefinitely, since it does not in any way interfere with the operation of the bicyle when in the position shown in Fig. 2.

Various changes in the form, shape, proportion and other minor details of construction may be made without departing from the principle or sacrificing any of the advantages of the claimed invention.

I claim:—

A wheel lock adapted for attachment to a bicycle frame, said lock including a clamping member adapted to be clamped to the frame, a link pivotally supported by the clamping member, a clamping member embodying spaced arms pivotally connected with the link, said arms having openings to receive a lock, and said arms adapted to be normally locked to the frame to which the first mentioned clamp is secured, and said arms adapted to embrace a portion of the adjacent frame section to lock the wheel against movement.

In testimony that I claim the foregoing as my own, I have hereto affixed my signature.

HAROLD EDWARD BROTEMARKLE.